CERTIFICATE OF CORRECTION.

Patent No. 2,369,132. February 13, 1945.

JAY E. BROWDER, ET AL.

It is hereby certified that error appears in the above numbered patent requiring correction as follows: In the drawings, Sheets 1 and 2 should appear as shown below instead of as in the patent - page 2, first column, line 4-5, for "signalus" read --signals--; page 5, second column, line 20, for "supplies" read --supplied--; line 43, for "heating" read --beating--; and that the said Letters Patent should be read with this correction therein that the same may conform to the record of the case in the Patent Office.

Signed and sealed this 26th day of June, A. D. 1945.

Leslie Frazer

(Seal)            Acting Commissioner of Patents.

Feb. 13, 1945. J. E. BROWDER ET AL 2,369,132
RADIO DIRECTION FINDER
Filed July 3, 1941 3 Sheets-Sheet 3

FIG_3

FIG_4

FIG_6

FIG_5

INVENTORS,
J.E. BROWDER AND F.L. MOSELEY,
By Herbert H. Thompson
THEIR ATTORNEY

Patented Feb. 13, 1945

2,369,132

UNITED STATES PATENT OFFICE 2,369,132

RADIO DIRECTION FINDER

Jay E. Browder, Garden City, N. Y., and Francis L. Moseley, Osborn, Ohio, assignors to Sperry Gyroscope Company, Inc., Brooklyn, N. Y., a corporation of New York Application July 3, 1941, Serial No. 400,894

18 Claims. (Cl. 250—11)

The invention relates to radio compass and direction finding apparatus and more particularly to direction finding apparatus in which an indicator is automatically oriented in correspondence with the direction of reception of a radio wave, thereby furnishing an indication of the bearing of the transmitting station. Such automatic radio direction finders or compasses, which have great utility on mobile craft, for example, airplanes, comprise in general an automatically oriented directional antenna and a stationary non-directional antenna, the signals received by the two antennae jointly controlling the orientation of the directional antenna, and thereby the orientation of the directional indicator. The non-directional antenna signal prevents an otherwise ambiguous indication resulting from the two positions of maximum and of minimum reception characteristic of a directional antenna, such as a loop, when used alone. The present invention comprises features constituting modifications of and improvements in direction finding apparatus of the above type particularly as disclosed by one of the present joint applicants, F. L. Moseley, in a prior application, now U. S. Patent No. 2,257,757, for Radio compass navigation apparatus, dated October 7, 1941.

To secure a reliable and stable indication of direction it is essential to supply to the antenna-orienting motor an operating potential suitable for causing the motor to rotate the directional or null antenna to the position of minimum signal reception (if the minimum is chosen as the position of rest) under all operating conditions, preferably by the shortest path, and for causing the antenna to assume that position in a substantially dead beat manner. To meet the first of these requirements and also to secure a precise indication of the minimum or null point, the ratio of the strengths of the directional and non-directional antenna signals must be of suitable value and should remain substantially constant, or at least not pass a limiting value, except when operating close to the null point, as will be further pointed out. The second requirement is related to the characteristics of the operating voltage supplied to the motor in the vicinity of the minimum or null position of the loop.

In our improved arrangement, among other features, we provide means for automatically adjusting and preventing undesired fluctuations in the ratio of the outputs of the two antennae and means for obtaining an applied motor voltage proportional to angular departure from the null for antenna displacements adjacent that position and a substantially constant motor voltage or signal for antenna displacements beyond a predetermined angle from the null.

The ratio of the two antennae outputs has a bearing on the character of the motor voltage as will be pointed out. In certain of the modifications of the invention disclosed in the aforementioned Patent No. 2,257,757, the radio frequency signal output from the directional antenna is modulated at a low frequency and the output of the non-directional antenna combined with the modulation products in a radio receiver to reproduce the modulating frequency which is then applied as the operating voltage to the antenna motor. This provides a low frequency voltage suitable for operating a commercial A. C. motor which, in the absence of limiting factors, is proportional in magnitude to the directional antenna signal and reverses in phase with said signal when the antenna passes through the null position, thus providing reversible motor operation for loop orientation.

It is undesirable in a circuit of the described type to have the ratio of directional antenna signal to non-directional antenna signal greater than a certain maximum value and, as the directional signal increases with increasing displacement of the loop from the null, to prevent this ratio increasing indefinitely we make use, according to certain forms of the present invention, of the receiver output at modulation frequency or a multiple thereof to control the ratio by varying the gain of a directional signal amplifier. The radio receiver output, it should be noted, contains a fundamental modulation frequency component and a multiple or multiples of the fundamental which vary in magnitude with receiving conditions. According to one modification of our present invention, we make use of the fundamental to control the directional antenna output, which method has important advantages over previous modes of operation but does not preclude all possibility of losing control of the antenna motor under abnormal conditions, for example, if a large directional antenna signal is suddenly applied to the receiver which may be the case if power is switched on with the loop positioned at a considerable angle from the null, or if structural failures occur. We have found that this disadvantage may be entirely overcome by another modification in which we make use of a component of double the modulation frequency in the receiver output to control the directional antenna signal gain. This latter modification we have found to provide suitable motor control even under extremely unfavorable conditions.

Variation of the non-directional signal, and resulting change of the ratio of two antenna signalus, may be occasioned by change of receiving conditions, that is, change of the effective height of the antenna which does not affect the directional signal. Effective height may also change radically due to icing of the antenna or to structural failure of the antenna or support. Our invention has in practice proved capable of maintaining stable motor operation even under such severe conditions. Variable shielding of the antenna by metallic portions of the craft's structure when close to a transmitter causes a further variation of effective height according to the position of the craft. On the other hand, the directional signal inherently varies with angular position of the loop without any corresponding change in the non-directional signal. It has previously been necessary to have a manually operated gain control, usually operating on the output of the directional antenna, to adjust the antenna output for varying conditions. This manual gain control and the operation thereof are eliminated by the use of our present invention.

Another disturbing factor whose effect is overcome by the invention is the change in the relationship of the electrostatic to the magnetic component of the received wave upon close approach to a transmitting station. At a distance of a few wave lengths or more from the source, these components are equal but close to the transmitter this relationship no longer holds and proper operation of a direction finder heretofore has required a readjustment of the ratio of the two antenna signals, which readjustment is eliminated by the present invention.

A further advantage of our arrangements is that they permit a high percentage of modulation of the non-directional carrier by the side frequencies to be used where previously it was necessary to use a normally low percentage of modulation because of the injurious effects of overmodulation when the effective height of the antenna decreased.

In addition to the above-mentioned advantages resulting from the automatic control of the directional antenna or loop signal, we obtain further operating advantages by the use, separately and in combination with the described features, of an automatic volume control of the so-called "delayed" type (D. A. V. C.) to regulate the output of the receiver. This control which only becomes effective above a certain minimum signal strength permits a gradual change of receiver output and hence of motor voltage up to the point at which the "delay" voltage is overcome, but prevents an undesired high voltage being applied to the motor when a very strong signal is received.

One object of our invention is to provide an automatic radio direction finder which provides a reliable and stable indication of direction under all operating conditions.

Another object is to provide an automatic direction finder which operates satisfactorily over a wide range of signal strengths.

Another object is to provide in a direction finder having a directional and a non-directional antenna, means for automatically adjusting the ratio of the outputs of the two antennae.

Another object is to provide means in apparatus of the above character for compensating for the effect of change of effective height of one of said antennae.

Another object is to provide an automatic direction finder in which the directional antenna is brought to its position of rest in a substantially dead beat manner and in which the voltage applied to the operating motor is prevented from attaining excessive values due to strong received radio signals.

Still another object is to secure in apparatus of the above character antenna motor torque directly proportional to the directional antenna signal for positions of said antenna adjacent the null point.

A further object is to provide an automatic gain control for the output of the directional antenna in an automatic direction finder actuated by a product of modulation in the receiver.

Other objects and advantages of this invention will become apparent as the description proceeds.

In the drawings,

Fig. 1 (Fig. 1A and Fig. 1B) is a wiring diagram of an automatic direction finder according to our invention.

Figure 1A:
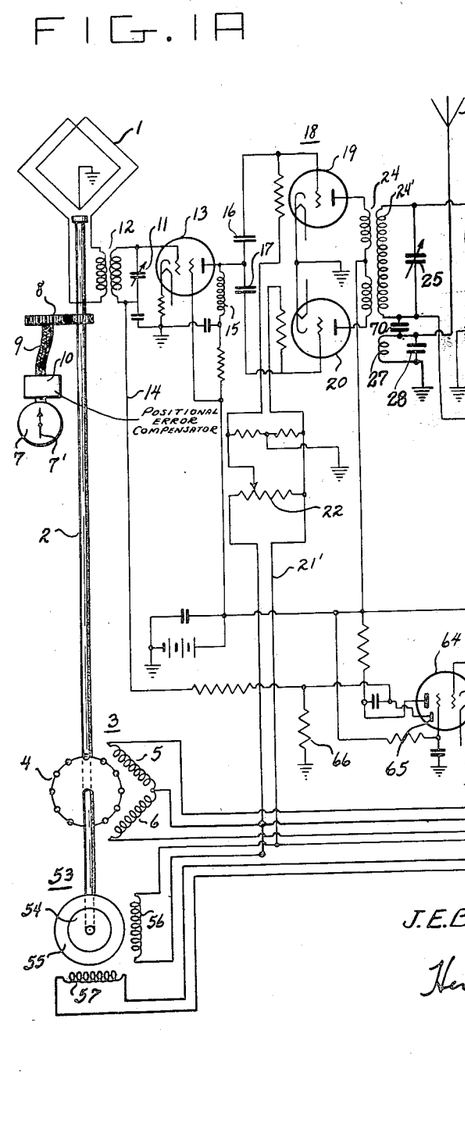

In Fig. 1A, reference numeral 1 is applied to a directional antenna or loop, mounted for rotation on shaft 2 driven by two-phase induction motor 3 having a rotor 4 and a pair of angularly spaced fields 5 and 6. The position of loop 1 is indicated on the face of indicator assembly 7 by rotatable pointer 7' driven from shaft 2 through gearing 8, flexible shaft 9, and positional error compensator 10. Compensator 10, shown in detail in Fig. 4, to be described later, comprises means for inserting a predetermined correction between the position of shaft 2 and the indication of pointer 7' to compensate for quadrantal errors, determined by experiment for the craft on which the direction finder is mounted.

The output of loop 1, at a frequency determined by the setting of variable condenser 11, is fed through transformer 12 to the grid circuit of vacuum tube 13. Grid return lead 14 is connected to a source of potential for applying a bias to this tube which adjusts its gain in inverse relationship to the received signal strength to supply an automatic modulation control, as will be later described. Tube 13 and associated circuits serve both as a radio frequency amplifier and as a phase shifter to alter the phase of the signal received from loop antenna 1 by approximately 90° in order that this signal may be combined with the output of the non-directional antenna 26 in proper phase relationship, it being known that the outputs of the two antennae differ in phase by that angle. The shift is accomplished by plate circuit inductor 15 which resonates by virtue of its own distributed capacity at a frequency below that of any signal in the operating band and hence constitutes an approximately pure reactive load.

The output of tube 13 is applied through condensers 16 and 17 to a balanced modulator 18 comprising vacuum tubes 19 and 20, the signal potential being applied in the same phase to the grids of the two tubes. A modulating potential at a low frequency $f_1$ is supplied from a source 21 by way of leads 21' to a potential divider 22 and is applied to the grids of tubes 19 and 20 in opposite phase relationship. It will be apparent to those skilled in the art that, due to the manner in which the radio frequency signal and the low frequency or audio modulating potential are applied, the modulation products appearing in the output of balanced modulator 18 will include frequencies equal to the sum and difference of the radio frequency $f_0$ and modulating frequency $f_1$, that is $f_0+f_1$ and $f_0-f_1$. These will be referred to as the side frequencies. If tubes 19 and 20 are properly balanced no output component of frequency $f_0$ will be present, that is, the high frequency carrier is suppressed.

The output of modulator 18 is coupled to a radio frequency amplifier tube 23 by transformer 24 having its secondary winding 24' tuned by variable condenser 25. Non-directional antenna 26 also supplies an input to tube 23 by way of transformer winding 27 inductively coupled to winding 24'. Amplifier tube 23, therefore, receives potentials proportional to the amplitudes of the two side frequencies and to the non-directional antenna output which latter signal is at the frequency $f_0$ of the original carrier supplied by the directional antenna.

A manual sensitivity adjustment controlling the gain of tube 23 is provided by rheostat 29. The output of this tube is coupled by transformer 30 to the converter and intermediate frequency amplifier 31 of a conventional superheterodyne receiver. The output of circuit 31, which is at intermediate frequency, is passed through transformer 32 to vacuum tube 33 which has elements and connected circuits permitting it to function as a combination intermediate frequency amplifier, low frequency amplifier, automatic volume control rectifier and automatic modulation control rectifier, as will now be described.

Figure 1B:
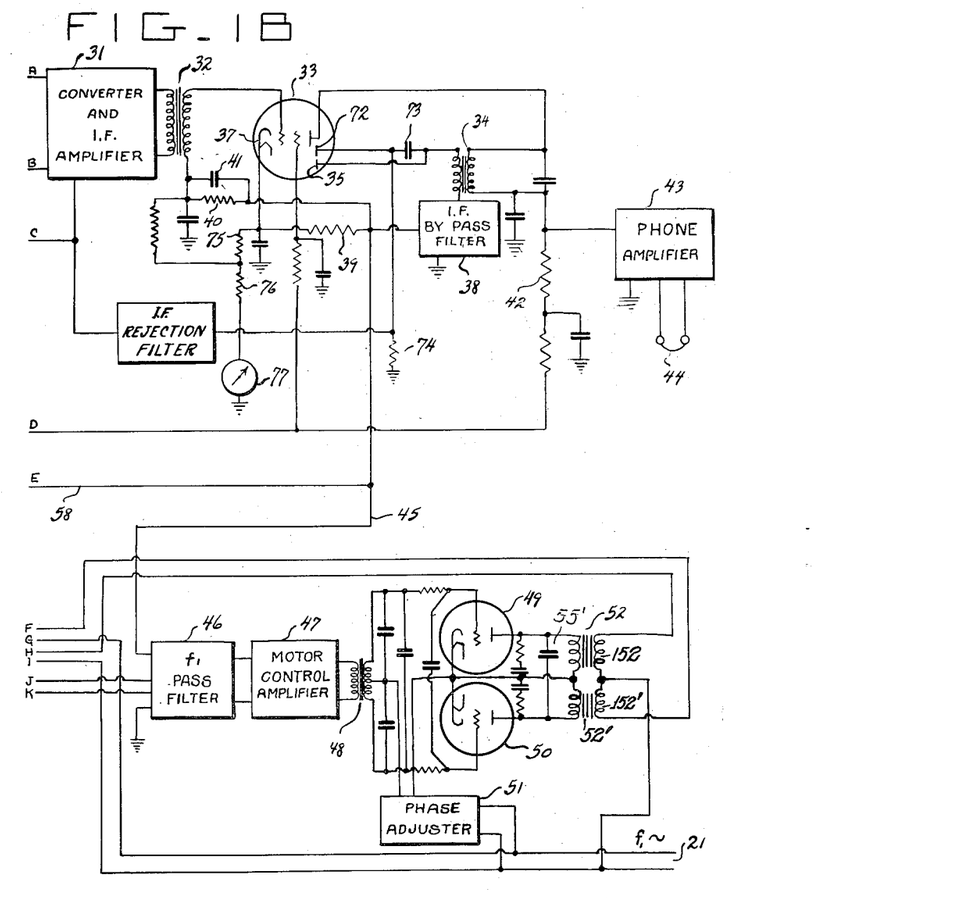

A signal at intermediate frequency applied to the grid of tube 33 is amplified and in the output circuit is fed back by way of transformer 34 to diode plate 35 of the tube. The signal is then demodulated to reproduce the original modulating frequency $f_1$ in a circuit which may be traced from cathode 37 to plate 35, the secondary winding of transformer 34, intermediate frequency by-pass filter 38, which removes components at that frequency, and resistance 39.

The voltage drop across resistance 39 at the frequency $f_1$ is applied to the grid of tube 33 through the parallel circuit comprising resistor 40 and condenser 41 and the secondary of transformer 32. This low frequency voltage is then amplified by tube 33 functioning as an A. F. amplifier and the major portion of the output voltage appears across resistor 42, the secondary of transformer 34 and associated condenser being of low impedance at the frequency $f_1$. The drop across resistor 42 is supplied as an input voltage to phone amplifier 43 and the amplified signal actuates telephone receivers 44, thus furnishing a channel for aural monitoring of the $f_1$ output.

The potential at frequency $f_1$ existing at the high side of resistor 39 is applied by lead 45 to filter 46 which passes this frequency but rejects associated components at other frequencies, and the output of the filter is amplified by motor control amplifier 47. The output of amplifier 47 is passed by transformer 48 to the grids of tubes 49 and 50 which are of the grid-controlled gaseous rectifier type commonly known as "thyratrons," the signal voltage on the two grids of these tubes being applied 180° out of phase. A voltage at frequency $f_1$ is applied through phase adjustor 51 in the same phase relationship to the grids of tubes 49 and 50 and serves as an A. C. bias for these tubes which are controlled by the known method of grid phase shift. The anodes of tubes 49 and 50 are connected to output transformers 52 and 52', respectively, which latter have a junction in common with the cathodes of these tubes. A capacitor 55' is placed between the respective anodes of tubes 49 and 50 to establish in cooperation with these tubes and transformers 52 and 52' a split phase voltage for exciting the motor 3, as will be explained hereinafter. Transformers 52 and 52' have low impedance secondary windings 152 and 152', respectively, which are connected to motor field windings 6 and 5, respectively.

Between a common connection of the secondary windings 152 and 152' and the junction point of windings 5 and 6 a voltage of frequency $f_1$ is applied which is the supply for the operation of motor 3 and also the plate supply of tubes 49 and 50, the application of this voltage to the motor being controlled by the state of conduction of tubes 49 and 50, as will be presently pointed out. In addition to driving loop 1, motor 3 drives anti-hunt generator 53 comprising a rotor having an iron core 54 surrounded by a conducting cylinder 55, for example, of copper, a field winding 56 connected to source 21 of frequency $f_1$ and a second winding 57 adapted to receive an E. M. F. by induction from winding 56 when cylinder 55 rotates, due to the formation of eddy currents in the cylinder. Winding 57 is connected to the input of filter 46 to supply a control voltage at frequency $f_1$ proportional to the speed of motor 3 for combination with the loop displacement voltage supplied by way of lead 45.

To secure automatic modulation control, the low frequency voltage drop across resistor 39 is utilized as the source of bias potential for the grid of tube 13. Two modifications are employed. According to the first modification the fundamental low frequency $f_1$ is selected by a filter 61 connected to resistor 39 by way of lead 58. Filter 61 comprising reactor 62 and capacitors 63 and 63' may be adjusted by switch 61' to select either frequency $f_1$ or twice that frequency by connecting capacitor 63 or 63', respectively across reactor 62. In the place of an adjustable filter, it will be obvious that a fixed filter may be employed having a frequency characteristic suitable for whichever mode of operation is desired. The frequency passed by filter 61, which according to the first modification is $f_1$, is applied to the grid of tube 64 serving both as an amplifier and rectifier. Amplification takes place in the triode section while rectification takes place in the diode section which includes plate 65. Due to rectification, a D. C. voltage appears across resistance 66 in the grid circuit of tube 13 and thereby applies a bias to this tube, the sense of which is such that an increase in output from tube 64 reduces the gain of amplifier tube 13. Tube 64 and associated circuits therefore function as an automatic gain control for amplifier 13, making the gain inversely proportional to the $f_1$ output of the receiver and as will be further described this controls modulation in the receiver.

By adjusting filter 61 to pass twice the fundamental frequency $2f_1$ or other even harmonic thereof, or by employing a fixed filter which passes this harmonic frequency, a second modification of the automatic modulation control, according to our invention, is obtained. This double frequency component is amplified and rectified by tube 64 and also supplies a D. C. voltage across resistor 66 in the manner described in connection with the first modification employing $f_1$ control. However, an entirely different mode of operation results, as will be further pointed out.

Volume control for the radio receiver is obtained by a circuit including diode plate 72 of tube 33 coupled to plate 35 by condenser 73, which has applied to it a voltage at intermediate frequency. Due to rectification in the tube, a D. C. voltage appears across resistance 74 when current flows in the circuit which may be traced from ground through resistance 74, plate 72, cathode 37, resistances 75 and 76, tuning meter 77 to ground. It will be apparent that a voltage exists across resistance 75 at all times due to the flow of cathode current and also across resistor 76 due to the same cause. No output appears across resistance 74 until the peak voltage applied to diode plate 72 exceeds the bias voltage appearing across resistances 75 and 76 in series. The drop across resistance 74 serves as a bias for the intermediate frequency amplifier tubes of converter and intermediate frequency amplifier circuit 31 and also for radio frequency amplifier 23.

Figure 2:
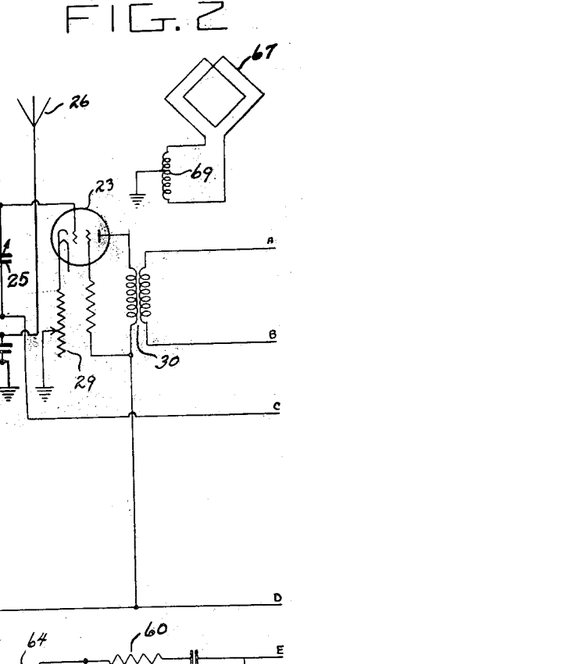
Fig. 2 is a diagram of an auxiliary loop circuit.

For certain conditions of radio signal reception to be later referred to, it is impractical to use an exposed and unshielded non-directional antenna such as 26. Provision is therefore made for the substitution of a second loop antenna 67, the wiring of which is shown in Fig. 2 and its assembly with loop 1 in Fig. 3. Preferably there is associated with loop 67 a transformer winding 69 center-tapped to ground. This transformer winding may be associated with winding 24' and coupled thereto by mutual inductance in the same manner as winding 27, it being understood that the two primary windings of transformer 24 are likewise both coupled to the single secondary winding 24'.

Antenna 1 will be referred to as the "null" loop, while antenna 67 will be referred to as the "sense" loop. These two loops are mounted to form an assembly in which the planes of the loops are positioned 90 degrees apart, as shown in detail in Fig. 3.

Figures 3, 4:
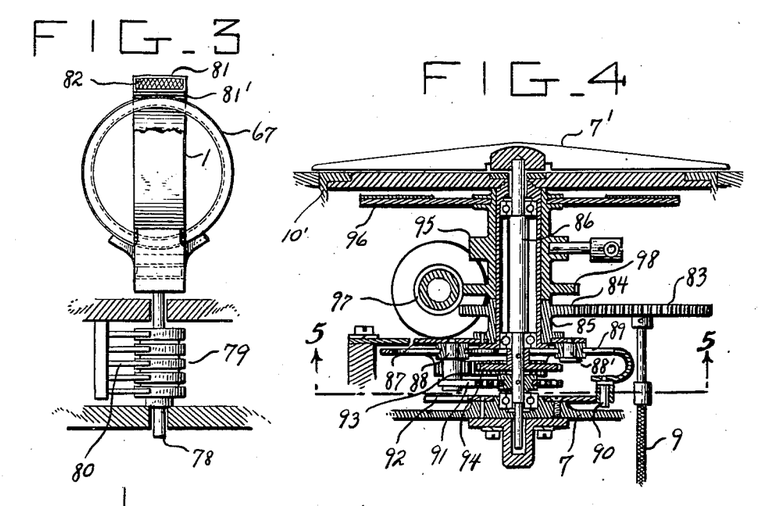
Fig. 3 is an elevation, partly in section, of an antenna assembly.
Fig. 4 is a sectional elevation of a positional error corrector.
Figure 5:
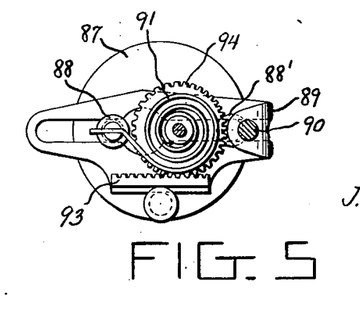
Fig. 5 is a section along line 5—5 of Fig. 4.

As seen in this figure, the two loops 1 and 67 are mounted at 90° on shaft 78 which also mounts slip rings 79 cooperating with brushes 80 to afford connection to the loops. Each loop has a pair of static shields as, for example, cylindrical shields 81 and 81' on the outside and inside, respectively, of winding 82 of loop 1. These shields, which are grounded, are not continuous but each has a slit which prevents the circulation of eddy currents around the shield.

It is found in the operation of a direction finder aboard a craft wholly or partially constructed of metal that errors are introduced by the distorting effect of re-radiation from the metallic structure. Such errors are usually referred to as "quadrantal" errors because of their similarity to errors of the magnetic compass designated by this term, and vary with different types of craft. To compensate for such errors, as noted, positional compensator 10 is introduced between the loop shaft 2 and pointer 7', the construction of which is seen more particularly in Fig. 4. In this figure the drive from the loop shaft is by way of flexible shaft 9 to gear 83, meshing with gear 84 on sleeve 85, freely rotatable about shaft 86. Sleeve 85 mounts circular disc 87 bearing studs 88 and 88' which guide slotted arm 89 for translation along the diameter thereof. A stud 90 carried by arm 89 is pressed by spiral spring 91 against flat cam 92 which is fixedly mounted on the housing of indicator assembly 7. This cam has a periphery formed to cause translational displacement of arm 89 in proportion to the error to be corrected at each loop position. Arm 89 further mounts a rack 93 meshing with pinion 94 on shaft 86, which shaft in turn mounts pointer 7' at its upper end. If cam 92 were circular, as disc 87 is rotated by shaft 9 arm 89 would experience no motion of translation and the rotation of shaft 9 would be transmitted directly to pointer 7'. If, however, cam 92 has a non-circular contour, translation of arm 89 by causing additional rotation of pinion 94 in one direction or the other, gives to pointer 7' a supplementary motion.

Mounted above sleeve 85, also for rotation about shaft 86, is a second sleeve 95 which mounts circular scale 96. Scale 96 may be turned by worm 97, meshing with worm wheel 98 on sleeve 95 for setting scale 96 manually, or automatic setting of scale 96 may be provided for from a direction maintaining instrument such as a compass or directional gyro. Pointer 7' may thus be read on two scales, a fixed scale 10' giving a radio bearing with respect to a reference line on the craft, while scale 96 may provide a bearing relative to the north-south line or other fixed reference in space.

The operation of the described arrangements is as follows: A radio signal of frequency $f_0$ received by loop 1 when suitably tuned by condenser 11, is amplified in tube 13 and the resulting voltage output applied in the same phase relationship to the grids of balanced modulator tubes 19 and 20. At the same time a voltage of frequency $f_1$ supplied from voltage divider 22 is applied in 180 degrees phase relationship to the same grids. Tubes 19 and 20 being biased to function as modulators, the principal components appearing in the output circuit are the two side frequencies $f_0+f_1$ and $f_0-f_1$. The phase of the directional antenna signal is shifted 90 degrees in the output of amplifier 13, and the outputs of tubes 19 and 20 are therefore in proper phase relationship to be combined with a signal at frequency $f_0$ supplied from non-directional or sense antenna 26. Tube 23 acts merely as a combining amplifier and passes an amplified version of its composite grid voltage to the converter and intermediate frequency amplifier 31 of the radio receiver where the signal is heterodyned to intermediate frequency. The A. V. C. diode section of tube 33 rectifies the intermediate frequency signal and applies a D. C. bias to the grids of the intermediate frequency amplifier tubes of circuit 31, which tends to maintain a constant output from this circuit after the applied signal reaches and passes a predetermined minimum value. This is the "delayed" automatic volume control or D. A. V. C. feature.

The second diode section 35 of tube 33 demodulates the intermediate frequency to obtain the modulating frequency $f_1$ (the output containing other frequencies under certain conditions) which is utilized for three purposes; first, to furnish a monitoring channel in connection with phone amplifier 43 and telephones 44 for monitoring the low frequency output of the receiver; second, to furnish the reversible phase motor control signal; and third, to supply the automatic gain control of directional antenna amplifier 13. For motor control the $f_1$ signal, taken from the high side of resistor 39, is applied to the grids of "thyratron" tubes 49 and 50. The incoming signal which can be shown to reverse in phase with reversal of phase of the directional antenna signal controls the operation of these tubes to produce an output proportional to the magnitude and phase of the input by a continuous shift of the phase of the grid potentials. This phase shift method of control is fully described in U. S. Patent No. 2,054,945, issued September 22, 1936, to R. H. Nisbet.

An incoming signal shifts the phase of the potentials of the grids of tubes 49 and 50 in opposite directions, thereby causing one tube to fire for a portion of the A. C. cycle longer than the other. Both tubes fire for the same small portion of the cycle during standby conditions, that is, when loop 1 is in its null position. Differential firing of the tubes causes the operation of motor 3 in one direction or the other in the following manner: Assuming for purposes of explanation that tube 49 fires for longer periods than tube 50, the impedance of the secondary winding 152 of transformer 52 is greatly reduced in comparison with the impedance of the secondary winding 152' of transformer 52' due to the shunting effect of the lowered impedance of the plate circuit of tube 49 when conducting, thereby permitting current to flow more freely through winding 6 of motor 3 than at standby. At the same time, because of the lowering of the impedance across the primary winding of transformer 52, condenser 55' is effectively connected across the primary winding of transformer 52' and the susceptance of this condenser is reflected through transformer 52' to supply leading current to winding 5 of the motor and produce a phase difference between the currents in windings 5 and 6, thereby setting up a rotating field causing rotation of rotor 4 in one direction. Similarly, when tube 50 fires exclusively or predominantly, currents in quadrature are supplied to the motor fields producing rotation in the opposite direction. Since the phase shift of the grid potentials of tubes 49 and 50 is progressive with change of amplitude of the receiver output the motor field currents vary correspondingly and the torque and speed of the motor are proportional to this output except as modified by the voltage developed in anti-hunt generator 53, which furnishes an auxiliary control voltage proportional to the speed of motor 3 to prevent hunting of this motor in a manner more fully described in U. S. Patent No. 2,115,086, issued April 26, 1938, to Alger S. Riggs.

The function of tube 64 and associated circuits will now be examined in greater detail. Considering first the mode of operation in which filter 61 is adjusted to pass the fundamental frequency $f_1$, the voltage across resistance 66 resulting from the rectified output of tube 64 reduces the gain of loop amplifier 13 in proportion to the receiver output at frequency $f_1$. This additional bias tends to prevent the building up of the loop signal which would otherwise occur with rotation away from the null and the eventual preponderance of this signal over that received by the antenna.

Figure 6:
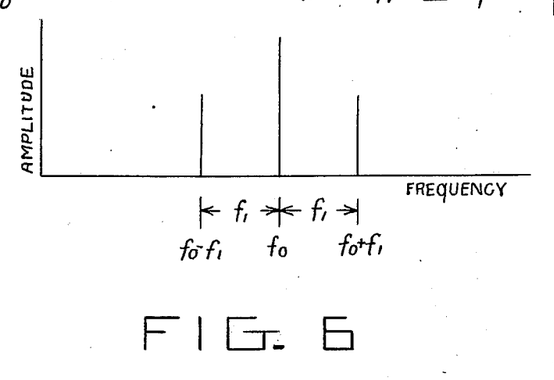
Fig. 6 is a diagram illustrative of one phase of the operation of the invention.

Considering next the mode of operation in which filter 61 is adjusted to pass the frequency $2f_1$, a rectified voltage proportional to this component appears across resistance 66 and applies a bias to tube 13 as above described but the occurrence of the double frequency component results from a different cause and therefore gives rise to a different control characteristic. This may be seen more clearly by reference to Fig. 6. This figure shows the relative spacing of the side frequencies produced by modulation in tubes 19 and 20, and the signal supplied by non-directional antenna 26. The two side frequencies, $f_0+f_1$ and $f_0-f_1$, are normally equal in amplitude and their frequency spacing is twice the modulating frequency $f_1$. Assuming the latter to be 100 cycles, the side frequencies will then be separated by 200 cycles. In the process of demodulation in tube 33 there therefore appear as output components, 100 cycles resulting from the interaction of $f_0$ with each side frequency and 200 cycles resulting from the interaction of the two side frequencies. The 100 cycle component is in all cases the applied motor control signal, the 200 cycle component being ineffective for this purpose. It will be apparent that when the value of $f_0$ supplied to the demodulator by the non-directional antenna is large relative to the value of the side frequencies the percentage of 200 cycle output will be small. A change in one component, such as an increase in loop signal, however, will produce a corresponding increase in side frequencies that introduce distortion, assuming no increase in the output of the non-directional antenna, and the 200 cycle component of the demodulator output will increase. By rectifying this 200 cycle component and applying the resultant D. C. voltage to reduce the gain of loop signal amplifier 13, the ratio of side frequencies to non-directional antenna output after adjustment to an optimum value may be held substantially constant at that value at loop angles beyond a predetermined range adjacent the null.

The injurious effect on motor operation of a high $2f_1$ component relative to the $f_1$ component will be apparent when it is considered that should $f_0$ decrease to a negligible value relative to the side frequencies the receiver output would be all at $2f_1$, produced by the beating of the two side frequencies, and under this condition the motor would not operate.

Another aspect of loop gain control by the $2f_1$ term is that at up to 100 per cent modulation of the $f_0$ non-directional antenna signal by the side frequencies in demodulator tube 33 very little $2f_1$ is produced. Overmodulation, however, causes this second harmonic distortion component and other even multiples thereof to increase rapidly, resulting in a decrease in the amplitude of the side frequencies through the operation of gain control tube 64. This tube and associated circuits provides in effect, therefore, an automatic modulation (or demodulation) control.

Another defect in previous arrangements which the $2f_1$ control remedies is the injurious effect of combining the side frequencies with the non-directional signal in the wrong phase relationship. This may occur due to phase shift over the tuning range of the direction finder or to failure of a circuit element. Such wrong phase relationship may seriously affect motor operation by producing a high percentage of $2f_1$. Our circuit employing $2f_1$ loop gain control automatically remedies this situation by adjusting the loop signal amplitude to compensate for the incorrect phase.

While the above description of the operation of the direction finder has been concerned chiefly with the arrangement in which a single loop and non-directional "sense" antenna are employed, under conditions of heavy precipitation static on an aircraft, it may be necessary for the sense antenna to take the form of "sense" loop 67. When this is done the two-loop antenna assembly of Fig. 3 is automatically oriented as before to a position in which the plane of "null" loop 1 is at right angles to the direction of reception, that is, the loop is in the null position. The phase of the received signal is then opposite for excursions in opposite directions from this position. The "sense" antenna or loop 67 however is in the position for maximum signal reception and the phase of its signal is not altered by excursions from this position of less than 90°. Also the magnitude of the "sense" signal varies very little about the position of maximum reception. Therefore this signal is very nearly equivalent to the signal from a non-directional sense antenna except that it does not render the system free from 180° ambiguity as may be shown by consideration of the phase relationships of the two loop signals.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by letters patent is:

1. In a radio receiving circuit, a shiftable directional receiving antenna, a low frequency source, means for modulating the radio frequency output of said antenna at the frequency of said source, a second receiving antenna, a receiver having an input jointly derived from the modulated output of said first antenna and the unmodulated output of said second antenna, said two antennae receiving waves from the same source, means for selecting from the output of said receiver a component having a frequency twice the frequency of said low frequency source, means connected to said receiver output for shifting said directional antenna toward a predetermined position, and means applying said component for regulating the magnitude of the utilized output of said directional antenna to control the ratio of the utilized outputs of said antennae and prevent overmodulation, said last named means being operable only when said directional antenna is displaced more than a preselected amount from said position.

2. In a radio direction finder, directional and sense antennae receiving radio signals from the same source, said directional antenna being shiftable relative to the radio waves received thereby and adapted to produce an output increasing in magnitude as the antenna becomes displaced further relative to a predetermined null position, means modifying the output of said directional antenna, an audio frequency source, a modulator producing modulation of the modified output of said one antenna at the frequency of said source, a radio receiver jointly receiving the modulated output of said one antenna and the unmodulated output of said other antenna, filter means for selecting from the output of said receiver an A. C. component of twice the frequency of said source, and means for applying said selected component to control said modifying means to stabilize the ratio of utilized outputs of said antennae and prevent overmodulation, said last named means being effective only when said directional antenna is displaced more than a preselected angle from said null position.

3. In a radio direction finder, a receiver, a rotatable directional antenna tuned to receive radio signals from a transmitter, a motor for rotating said antenna, an amplifier having a gain control modifying the output of said antenna, a low frequency source, a balanced modulator connected to receive jointly said modified output and an E. M. F. from said source and to supply side frequencies resulting from modulation of said radio signals by said E. M. F. to said receiver, a non-directional antenna supplying an unmodulated carrier at the frequency of said transmitter to said receiver, filter means for selecting from the output of said receiver a component at the frequency of said source, said component being applied to operate said motor, filter means for selecting from said receiver output a component of double the frequency of said source, and means for actuating said gain control by said double frequency component in a manner to increase the ratio of said source frequency component to said double frequency component and thereby improve the operation of said motor.

4. In a radio direction finder, a directional antenna receiving radio signals from a distant transmitter, an adjustment modifying the output of said antenna, an A. C. source, a balanced modulator connected to receive said modified output and produce modulation thereof at the frequency of said source, a sense antenna receiving signals from said transmitter simultaneously with said directional antenna, a radio receiver including a demodulator receiving the side frequencies resulting from said modulation and an E. M. F. derived from the output of said sense antenna, filter means for selecting from the output of said receiver a component of twice the frequency of said source, and means automatically actuating said modifying adjustment in accordance with the magnitude of said double frequency component.

5. In a radio direction finder, a rotatable directional antenna, and a sense antenna, an audio frequency A. C. source, means for modulating the output of said directional antenna at the frequency of said source, and means for automatically adjusting the ratio of the amplitude of the resultant side-frequency components to the amplitude of the output of said non-directional antenna to reduce variations in said ratio, comprising radio receiver means receiving said side frequency components and said sense antenna output and producing an output having components including an even multiple harmonic of the frequency of said source, the amplitude of said harmonic varying with said ratio, means connecting the output of said receiver to effect rotation of said directional antenna toward a predetermined position, and means effective only when said directional antenna is displaced more than a predetermined angle from said position for automatically varying one term of said ratio in accordance with the amplitude of said harmonic and in a sense tending to keep said ratio constant.

6. In a radio direction finder, a radio receiver including a modulator, a directional antenna and a sense antenna both connected to said receiver, an audio frequency source supplying a wave to said receiver for modulating signals received by one of said antennae, a radio frequency amplifier connected between one of said antennae and said receiver, means for selecting a distortion component of said wave resulting from the application of said wave to said receiver, and means for controlling the gain of said amplifier in response to said component.

7. In a radio direction finder having a radio receiver and a pair of crossed loops employed respectively as a "null" loop and a "sense" loop, a source of low frequency energy, means for modulating the output of the "null" loop at the frequency of said source, adjustable means modifying the output of one of said loops, combining means for supplying a composite input to said receiver derived from the outputs of said two loops, filter means for selecting from the output of said receiver a component of twice the frequency of said source, and means for actuating said adjustable means in accordance with said selected component.

8. In an automatic radio direction finder, a rotatable directional antenna, means including an auxiliary signal antenna, a modulator and a source of relatively low modulation frequency for translating the radio frequency signal received by said rotatable antenna into a low frequency signal proportional in amplitude to said radio signal, the fundamental frequency component of said low frequency signal reversing in phase with said radio signal, a motor connected to rotate said directional antenna, a control circuit for said motor receiving said fundamental frequency component of said low frequency signal to reversibly control said motor proportionally thereto, and a circuit selecting a component of said low frequency signal of an even multiple of the fundamental frequency and controlling the magnitude of the output of said rotatable antenna in accordance therewith to modify thereby the magnitude of said signal to the motor control circuit.

9. In a radio direction finder, a receiver, a rotatable directional antenna tuned to receive radio signals from a transmitter, a motor for rotating said antenna, an amplifier having a gain control modifying the output of said antenna, a low frequency source, a balanced modulator connected to receive jointly said modified output and an E. M. F. from said source and to supply side frequencies resulting from modulation of said radio signals by said E. M. F. to said receiver, a sense antenna supplying an unmodulated carrier at the frequency of said transmitter to said receiver, filter means for selecting from the output of said receiver a component at the frequency of said source, said component being applied to operate said motor, filter means for selecting from said receiver output a component of twice the frequency of said source, and means for actuating said gain control by said double frequency component in a manner to increase the ratio of said source frequency component to said double frequency component and thereby improve the operation of said motor.

10. In an automatic direction finder, a rotatable directional antenna, a sense antenna, a motor for rotating said directional antenna, a control circuit for said motor, a source of fundamental audio frequency, means embodying balanced modulator means for modulating the radio frequency carrier wave output of a first of said antennas at said audio frequency and combining the same with the unmodulated radio frequency output of the second of said antennas, demodulator means for extracting a component representing an even multiple of said fundamental audio frequency, and means responsive to said component to limit the magnitude of the ratio of the utilized output of said first antenna to that of said second antenna.

11. In an automatic radio range finder, a movable directional antenna for receiving radio waves, means for amplifying the radio frequency output of said antenna, a balanced modulator wherein said radio frequency output is modulated at a lower frequency, a second antenna for receiving said radio waves, means for combining the modulated output of said directional antenna with the unmodulated output of said second antenna and feeding the same to a receiver, a motor for driving the directional antenna, a motor control circuit connected to the receiver output, automatic control means for limiting the energy applied by said receiver output to the motor control circuit, and feed back means between said receiver and said amplifying means responsive to distortion in said combined outputs for controlling the utilized output of said directional antenna.

12. In a radio direction finder, directional and sense antennas for receiving a carrier wave, balanced modulator means for modulating at a fixed audio frequency the carrier wave received by one of said antennas and for suppressing said carrier from the resulting modulated wave, and means for forming a composite wave of the carrier wave received from the other of said antennas and of the side frequencies of said modulated wave as components in proportions determined by the audio frequency second harmonic content in said composite wave.

13. In a radio direction finder, directional and sense antennas for receiving a carrier wave, balanced modulator means for modulating at a fixed audio frequency the carrier wave received by said directional antenna and for suppressing said carrier from the resulting modulated wave, means for forming a composite wave of the carrier wave received from said sense antenna and of the side frequencies of said modulated wave as components, and means responsive to distortion in said composite wave for proportioning said components so that an increase of said distortion in said composite wave relatively increases said sense antenna carrier component.

14. In a radio direction finder, the combination comprising a radio receiver, a directive null antenna and a sense antenna, an audio frequency source of energy, means for modulating the output of one of said antennas at the frequency of said source, adjustable means modifying the output of one of said antennas, combining means for supplying a composite input to said receiver derived from the outputs of said two antennas, filter means for selecting from the output of said receiver a distortion component, and means for actuating said adjustable means in accordance with said component.

15. In a radio direction finder, the combination comprising a radio receiver, a directional antenna and a sense antenna, an audio frequency energy source, means for modulating the output of one of said antennas at said audio frequency, combining means for supplying to said receiver composite signals having as components the output of the other of said antennas and the modulated output of said one of said antennas, said combining means including means for varying the proportions of said components as a function of the audio frequency second harmonic content of said composite signals.

16. In a radio direction finder control system, the steps comprising deriving radio frequency directional and sense carrier signals from a radiated electromagnetic wave, modulating at fixed audio frequency said directional carrier signals, forming a composite wave by combining the side frequencies of said modulated signals with said sense carrier signals as components, and controlling the ratio of said components as a function of an even audio frequency harmonic content in said composite wave.

17. In a radio direction finder control system, the steps comprising deriving directional carrier signals and sense carrier signals from a radiated electromagnetic wave, amplifying at least one of such groups of signals, modulating one of such groups of carrier signals at a fixed audio frequency, forming a composite wave of the side frequencies of the modulated signals and of the other carrier signals, and controlling the degree of said amplification as a function of the audio frequency second harmonic content of said composite wave.

18. In a radio direction finder, directional and sense antennas for receiving a carrier wave, balanced modulator means for modulating at a fixed audio frequency the carrier wave received by one of said antennas and for suppressing said carrier from the resulting modulated wave to obtain side frequencies only, wave combining means for forming a composite wave from components comprising said side frequencies and said carrier wave received by the other of said antennas, amplitude adjusting means for modifying the amplitude of at least one of the components utilized by said wave combining means, and means responsive to harmonic distortion in said composite wave for controlling said amplitude adjusting means to alter the amplitude ratio of said components and thus tend to reduce said distortion.

JAY E. BROWDER.
FRANCIS L. MOSELEY.